US012744247B1

(12) United States Patent
Wu et al.

(10) Patent No.: US 12,744,247 B1
(45) Date of Patent: Sep. 22, 2026

(54) ELECTROLYTE SOLUTION, LITHIUM ION BATTERY AND ELECTRIC DEVICE

(71) Applicant: Contemporary Amperex Technology Co., Limited, Ningde City (CN)

(72) Inventors: Zeli Wu, Ningde City (CN); Changlong Han, Ningde City (CN)

(73) Assignee: Contemporary Amperex Technology Co., Limited

( * ) Notice: Subject to any disclaimer, the term of this patent is extended or adjusted under 35 U.S.C. 154(b) by 820 days.

(21) Appl. No.: 17/937,786

(22) Filed: Oct. 4, 2022

Related U.S. Application Data

(63) Continuation of application No. PCT/CN2021/107852, filed on Jul. 22, 2021.

(51) Int. Cl.
*H01M 6/18* (2006.01)
*H01M 10/0525* (2010.01)
*H01M 10/0567* (2010.01)
*H01M 10/0568* (2010.01)
*H01M 10/0569* (2010.01)

(52) U.S. Cl.
CPC .................. *H01M 10/0568* (2013.01); *H01M 10/0525* (2013.01); *H01M 10/0567* (2013.01); *H01M 10/0569* (2013.01); *H01M 2300/0028* (2013.01)

(58) Field of Classification Search
CPC ......... H01M 10/0568; H01M 10/0566; H01M 10/052; H01M 10/0525; H01M 10/0567; H01M 10/0569; H01M 2300/0028; H01M 2300/0037
See application file for complete search history.

(56) References Cited

U.S. PATENT DOCUMENTS

2012/0258357 A1 10/2012 Kim

FOREIGN PATENT DOCUMENTS

CN 105406124 A 3/2016
CN 105489933 A 4/2016
CN 107611479 A 1/2018
CN 109148796 A * 1/2019 .......... H01M 50/417
CN 109994777 A 7/2019
CN 110190332 A 8/2019
CN 110233291 A * 9/2019 ........ H01M 10/0568
CN 110444810 A 11/2019
CN 110752408 A 2/2020
CN 110828893 A 2/2020
CN 111834665 A 10/2020
CN 111900481 A 11/2020
CN 112054242 A 12/2020
CN 112216870 A 1/2021
CN 112635832 A 4/2021
EP 3435470 A1 * 1/2019 ............. H01G 11/56
JP 2017147184 A 8/2017
WO 2021108995 A1 6/2021
WO 2021127996 A1 7/2021
WO 2021127997 A1 7/2021
WO 2021127999 A1 7/2021

OTHER PUBLICATIONS (Translation of CN-110233291) Zhu et al, “A Balance-12V Start-stop Of Wide Temperature With Lithium Battery Electrolyte”, Sep. 13, 2019.*
(Translation of CN-109148796) Luski et al, “For Acid Scavenger Function Diaphragm Of Lithium Ion Electrochemical Cell Power Performance”, Jan. 4, 2019.*
International Search Report received in PCT Application PCT/CN2021/107852 on Jan. 19, 2022.
Written Opinion received in PCT Application PCT/CN2021/107852 on Jan. 19, 2022.
First Office Action received in the counterpart Chinese Application 202180010209.4, mailed on Apr. 11, 2024.
Notice of Reasons for Refusal received in the counterpart Japanese Application 2022-551386, mailed on Mar. 5, 2024.
The extended European search report received in the counterpart European Application 21930592.7, mailed on Sep. 28, 2023.
Notice of Reasons for Refusal received in the counterpart Japanese Application 2022-551386, mailed on Sep. 19, 2023.
First OA Received in KR Application No. 10-2022-7029845; mailed Nov. 16, 2024.
Third OA Received in JP Application No. 2022-551386; mailed Oct. 15, 2024.
First OA Received in CN Application No. 202411210336.0; mailed Jan. 22, 2025.
Notice of Granting Invention Patent Rights Received in CN Application No. 202180010209.4; mailed Jul. 1, 2024.

* cited by examiner

*Primary Examiner* — Raymond Alejandro
(74) *Attorney, Agent, or Firm* — K&L Gates LLP

(57) ABSTRACT

An electrolyte solution of a lithium ion battery is provided by limiting a relative ratio of cyclic ester to lithium salt in the electrolyte solution of the lithium ion battery, the electrolyte solution simultaneously containing the cyclic ester and the lithium salt has good conductivity, oxidation resistance, system stability and proper viscosity, and conductivity of a negative interface film may be improved, such that the lithium ion battery containing the electrolyte solution has a remarkably improved high-temperature storage performance and high-temperature cycle performance, and meanwhile has a good power performance.

15 Claims, 2 Drawing Sheets

ELECTROLYTE SOLUTION, LITHIUM ION BATTERY AND ELECTRIC DEVICE

CROSS-REFERENCE TO RELATED APPLICATION

This application is a continuation of International Application PCT/CN2021/107852, filed Jul. 22, 2021, and entitled "ELECTROLYTE SOLUTION, LITHIUM ION BATTERY AND ELECTRIC DEVICE", which is incorporated herein by reference in its entirety.

TECHNICAL FIELD

The present disclosure relates to the field of lithium battery technologies, and particularly to an electrolyte solution, a lithium ion battery, a battery module, a battery pack and an electric device.

BACKGROUND ART

In recent years, as lithium ion batteries have a more and more extensive disclosure range, the lithium ion batteries are widely applied to energy storage power systems, such as hydraulic power stations, thermal power stations, wind power stations, solar power stations, or the like, and to a plurality of fields, such as electric tools, electric bicycles, electric motorcycles, electric automobiles, military equipment, aerospace, or the like.

However, after the lithium ion battery is assembled in the above electric device, an actual working environment of the battery may have a high temperature due to limitation of an assembly space and an influence of heat released by other components of the electric device, such that cycle and storage performances of the battery in the actual electric device cannot be effectively improved only by improving the cycle and storage performances of the battery at a normal temperature, and therefore, development and design of a lithium ion battery with an excellent high-temperature cycle performance have great practical value.

SUMMARY

The present disclosure is made in view of the above problem, and an object thereof is to provide an electrolyte solution which may effectively improve a high-temperature storage performance and a high-temperature cycle performance of a battery, and to provide a lithium ion battery, a battery module, a battery pack and an electric device including the electrolyte solution according to the present invention.

In order to achieve the above object, a first aspect of the present disclosure provides an electrolytic solution, including electrolyte salt and an organic solvent, wherein the electrolyte salt includes lithium salt, the organic solvent includes cyclic ester, and a mass fraction W1 of the lithium salt in the electrolytic solution and a mass fraction W2 of the cyclic ester in the electrolytic solution satisfy $$0.2 \leqq \frac{W1}{W2} \leqslant 1.06.$$

In some embodiments, $$\frac{W1}{W2}$$

ranges from 0.5 to 1.06, optionally from 0.8 to 1.0 in the electrolyte solution according to the present disclosure.

In some embodiments, a mass fraction B of the cyclic ester with respect to the organic solvent is 5%-18%, optionally 13%-16% in the electrolyte solution according to the present disclosure.

In some embodiments, in the electrolyte solution according to the present disclosure, the lithium salt includes at least one of lithium bis(fluorosulfonyl)imide and lithium hexafluorophosphate, and the cyclic ester includes at least one of ethylene carbonate and propylene carbonate.

In some embodiments, a sum of a molar concentration C1 of the lithium bis(fluorosulfonyl)imide and a molar concentration C2 of the lithium hexafluorophosphate is 0.86M-1.4M in the electrolyte solution according to the present disclosure.

In some embodiments, the electrolyte solution according to the present disclosure includes a film formation additive, and a mass fraction A of the film formation additive in the electrolyte solution and the mass fraction W2 of the cyclic ester in the electrolyte solution satisfy:

$$10 \leq \frac{W2}{5} + 2 * A \leq 16.$$

A second aspect of the present disclosure provides a lithium ion battery, including: the electrolyte solution according to the first aspect of the present disclosure, a separator, a negative plate and a positive plate.

In some embodiments, the positive plate includes a positive active material $LiNi_xCo_yMn_zO_2$, x+y+z=1, and the mass fraction W2 of the cyclic ester in the electrolyte solution and a nickel atom content x satisfy a relation:

$$0.5 \leqslant \frac{W2}{100x} \leqslant 0.72.$$

In some embodiments, the positive plate includes a positive active material $LiNi_xCo_yMn_zO_2$, x+y+z=1, and the nickel atom content x is 0.5 or more, optionally 0.65, 0.8 and 0.96, from the perspective of cooperation with the electrolyte solution according to the present disclosure.

In some embodiments, in the lithium ion battery according to the present disclosure, a loading quantity H (in g) of a negative material on a 1,540.25 $mm^2$ surface of a current collector and the mass fraction W2 of the cyclic ester in the electrolyte solution satisfy a relation:

$$20 \leqslant \frac{W2}{H} \leqslant 166.$$

Beneficial Effects

In the present disclosure, by limiting the relative ratio of the cyclic ester to the lithium salt in the electrolyte solution of the lithium ion battery, the electrolyte solution simultaneously containing the cyclic ester and the lithium salt has good conductivity, oxidation resistance, system stability and proper viscosity, and conductivity of a negative interface film may be improved, such that the lithium ion battery containing the electrolyte solution has the remarkably improved high-temperature storage performance and high-temperature cycle performance, and meanwhile has a good power performance.

DETAILED DESCRIPTION OF EMBODIMENTS

Figure 1:
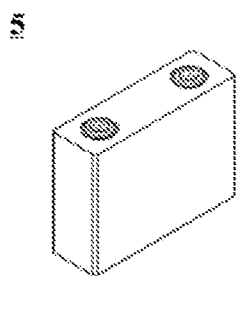
FIG. 1 is a schematic diagram of a lithium ion battery according to an embodiment of the present disclosure.

Hereinafter, embodiments which specifically disclose an electrolyte solution, a lithium ion battery, a battery module, a battery pack and an electric device according to the present disclosure will be described in detail with reference to the accompanying drawings as appropriate. However, unnecessary detailed descriptions may be omitted in some cases. For example, detailed descriptions of well-known matters and repetitive descriptions of actually same structures may be omitted. This is for avoiding unnecessary and redundant description in the following, and facilitating the understanding of the person skilled in the art. Furthermore, the drawings and the following description are provided for those skilled in the art to fully understand the present disclosure, and are not intended to limit the subject matter recited in the claims.

A "range" disclosed herein is defined in terms of lower and upper limits, with a given range being defined by selecting one lower limit and one upper limit which define boundaries of the particular range. The ranges defined in this way may be inclusive or exclusive, and may be arbitrarily combined; that is, any lower limit may be combined with any upper limit to form a range. For example, if ranges of 60-120 and 80-110 are listed for a particular parameter, it is understood that ranges of 60-110 and 80-120 are also contemplated. Furthermore, if listed minimum range values are 1 and 2, and listed maximum range values are 3, 4, and 5, the following ranges are all contemplated: 1-3, 1-4, 1-5, 2-3, 2-4, and 2-5. In the present disclosure, unless stated otherwise, a numerical range of "a-b" represents a shorthand representation of any combination of real numbers between a and b, both a and b being real numbers. For example, a numerical range of "0-5" indicates that all real numbers between "0 and 5" are listed herein, and "0-5" is only a shorthand representation of a combination of these numbers. In addition, when a parameter is expressed to be an integer greater than or equal to 2, the expression equivalently discloses that the parameter is, for example, an integer of 2, 3, 4, 5, 6, 7, 8, 9, 10, 11, 12, or the like.

REFERENCE NUMERALS

5, lithium ion battery; 51, housing; 52, electrode assembly; 53, top cover assembly All embodiments and optional embodiments of the present disclosure may be combined with each other to form new technical solutions, unless otherwise specified.

All technical features and optional technical features of the present disclosure may be combined with each other to form new technical solutions, unless otherwise specified.

All steps of the present disclosure may be performed sequentially or randomly, preferably sequentially, unless otherwise specified. For example, the method includes steps (a) and (b), which means that the method may include steps (a) and (b) performed sequentially or steps (b) and (a) performed sequentially. For example, the expression that the method may further include step (c) means that step (c) may be added to the method in any order; for example, the method may include steps (a), (b) and (c), or steps (a), (c) and (b), or steps (c), (a) and (b), or the like.

The terms "include" and "contain" mentioned herein are either open or closed, unless otherwise specified. For example, the terms "include" and "contain" may mean that additional components not listed may also be included or contained, or only listed components may be included or contained.

In the present disclosure, the term "or" is inclusive, unless otherwise specified. For example, the phrase "A or B" means "A, B, or both A and B". More specifically, any one of the following conditions satisfies the condition "A or B": A is true (or present) and B is false (or not present); A is false (or not present) and B is true (or present); or both A and B are true (or present).

With long-term experience of preparing an electrolyte solution, the inventor of the present disclosure finds that, for an electrolyte solution of a lithium ion battery, addition of a cyclic ester solvent into the electrolyte solution may obviously improve a dissociation function of lithium salt, thereby obviously increasing overall conductivity of the electrolyte solution, and meanwhile improving composition of a negative interface film, effectively preventing further side reaction of the solvent on a surface of a negative electrode, and achieving an important function of improving an electrochemical performance of the battery.

However, after a large number of experiments, it is found that when applied to the electrolyte solution, the cyclic ester solvent is prone to enrichment on a surface of a positive electrode compared with other types of solvents, and cyclic ester enriched on the surface of the positive electrode tends to be oxidized and decomposed, such that loss of solvent components in the electrolyte solution is increased, and a large amount of gas is generated, thus finally deteriorating a cycle performance and a storage performance of the battery. Secondly, the cyclic ester has obviously higher viscosity than other types of common solvents, such that system viscosity of the electrolyte solution is increased, which does not facilitate lithium ion transport and is also detrimental to the electrochemical performance of the battery.

The inventor further finds that the storage performance and the cycle performance of the lithium ion battery containing the cyclic ester solvent inside are greatly deteriorated in a high temperature environment compared with a normal temperature environment, and as a result of intensive research and analysis, the inventor infers that the reason may be that a high temperature prompts faster and more abundant enrichment of the cyclic ester solvent on the surface of the positive electrode, and meanwhile accelerates decomposition of the cyclic ester enriched on the surface of the positive electrode, and the high temperature environment finally deteriorates the cycle performance and the storage performance of the battery.

Based on this, after a large number of experiments, the inventor(s) finds that, on the premise of sufficiently guaranteeing high conductivity of the electrolyte solution, cooperative adjustment of a relative content of the cyclic ester and the lithium salt in the electrolyte solution within a specific range may remarkably improve an enrichment rate and an enrichment quantity of the cyclic ester solvent on the positive electrode, slow down oxidative decomposition of the positive electrode, and meanwhile remarkably improve the system viscosity of the electrolyte solution, and finally remarkably improve the cycle performance, the storage performance and a power performance of the lithium ion battery with the cyclic ester solvent at a high temperature.

The formula of the electrolyte solution according to the present disclosure is particularly suitable for a ternary lithium ion battery with a high nickel atom content, even a ternary lithium ion battery with an ultrahigh nickel atom content.

The formula of the electrolyte solution according to the present disclosure is particularly suitable for improving the cycle performance, the storage performance and the power performance of the lithium ion battery at a high temperature.

[Electrolyte Solution]

A first aspect of the present disclosure provides an electrolytic solution, including electrolyte salt and an organic solvent, wherein the electrolyte salt includes lithium salt, the organic solvent includes cyclic ester, and a mass fraction W1 of the lithium salt in the electrolytic solution and a mass fraction W2 of the cyclic ester in the electrolytic solution satisfy $$0.2 \leq \frac{W1}{W2} \leq 1.06.$$

The electrolyte salt in the present disclosure may be at least one of lithium hexafluorophosphate, lithium tetrafluoroborate, lithium perchlorate, lithium hexafluoroarsenate, lithium bis-fluorosulfonylimide, lithium bis-trifluoromethanesulfonylimide, lithium trifluoromethanesulfonate, lithium difluorophosphate, lithium difluorooxalato borate, lithium dioxalato borate, lithium difluorobisoxalate phosphate, and lithium tetrafluorooxalato phosphate.

The cyclic ester in the present disclosure may be more than one of ethylene carbonate (EC), propylene carbonate (PC), butylene carbonate (BC), and vinylethylene carbonate (VEC). Optionally, the cyclic ester may be at least one of ethylene carbonate and propylene carbonate.

It should be noted that when more than one type of lithium salt exists in the electrolyte solution, "the mass fraction of the lithium salt in the electrolyte solution" refers to a mass fraction of all types of lithium salt in the electrolyte solution. Similarly, when more than one type of cyclic ester exists in the electrolyte solution, "the mass fraction of the cyclic ester in the electrolyte solution" refers to a mass fraction of all types of cyclic ester in the electrolyte solution.

The present disclosure aims to develop a formula of an electrolyte solution which combines good conductivity, oxidation resistance, system stability, and appropriate viscosity and may improve conductivity of a negative interface film. After a large number of experiments, it is found that when the content of the cyclic ester and the content of the lithium salt in the electrolyte solution meet the specific matching relation $$\left(0.2 \leq \frac{W1}{W2} \leq 1.06\right),$$

the developed electrolyte solution has unexpected beneficial effects, an electrolyte solution system has good conductivity, oxidation resistance, system stability and appropriate viscosity, the conductivity of the negative interface film is improved, the enrichment rate and the enrichment quantity of the cyclic ester solvent on the positive electrode are improved, the oxidative decomposition of the positive electrode is slowed down, and the corresponding lithium ion battery has a good high-temperature cycle performance and high-temperature storage performance.

After lots of research, the inventor finds that in order for the electrolyte solution for the lithium ion battery to have excellent conductivity, the lithium salt and the cyclic ester in a commercial electrolyte solution on the market usually have a ratio $$\frac{W1}{W2}$$

above 1.5, but actually, this ratio of the lithium salt to the cyclic ester is over high, and therefore, oxidative decomposition reaction at the positive electrode is quite serious, thus seriously deteriorating high-temperature storage gas production and high-temperature cycle performances of the battery; after years of development, the ratio $$\frac{W1}{W2}$$

of the lithium salt to the cyclic ester solvent does not exceed 1.5 in the field of lithium ion battery electrolyte solutions. After a large number of experiments, an electrolyte solution system with $$0.2 \leq \frac{W1}{W2} \leq 1.06$$

is developed in the present disclosure, thus remarkably improving the high-temperature storage performance and the high-temperature cycle performance of the battery. For details, reference may be made to Table 1.

In some embodiments, $$\frac{W1}{W2}$$

ranges from 0.5 to 1.06, optionally from 0.8 to 1.0 in the electrolyte solution according to the present disclosure. For details, reference may be made to Table 1.

By further limiting the range of $$\frac{W1}{W2},$$

ingredients of the electrolyte solution may be further optimized, such that the electrolyte solution forms a good solvation structure, the structure prompts the electrolyte solution to form inorganic-organic composite interface films with better conductivity on the surfaces of the positive electrode and the negative electrode, and therefore, the battery not only has a remarkably improved high-temperature storage performance and high-temperature cycle performance, but also has a good power performance.

In some embodiments, $$\frac{W1}{W2}$$

may be selected from any numerical range formed by specific point values in Table 1.

In some embodiments, a mass fraction B of the cyclic ester with respect to the organic solvent is 5%-18%, 13%-16% in the electrolyte solution according to the present disclosure.

After full research, in the electrolyte solution containing the cyclic ester solvent on the current market, the content of the cyclic ester with respect to the organic solvent is basically maintained to be more than 20%, thus easily causing problems of serious high-temperature storage gas generation and a poor high-temperature cycle performance of the battery. In the present disclosure, types and contents of specific substances of the electrolyte solution are reasonably adjusted to reduce the content of the cyclic ester to 5%-18%, thus remarkably improving the high-temperature storage performance, the high-temperature cycle performance and the power performance of the battery. The high-temperature cycle performance and the high-temperature storage performance of the lithium ion battery are further improved by further limiting the numerical value of B within the range of 13%-16%. For details, reference may be made to Table 2.

In some embodiments, B may be selected from any numerical range formed by specific point values in Table 2.

In some embodiments, optionally, in the electrolyte solution according to the present disclosure, the lithium salt may be at least one of lithium bis(fluorosulfonyl)imide and lithium hexafluorophosphate.

In some embodiments, a molar concentration C1 of the lithium bis(fluorosulfonyl)imide and a molar concentration C2 of the lithium hexafluorophosphate have a ratio $$\frac{C1}{C2} \text{ of } 0.05-5,$$

optionally 1-3.5.

In the present disclosure, the content of cyclic carbonate is limited, which limits a capability of dissociating the lithium salt to a certain extent, thus influencing the conductivity of the electrolyte solution to a certain degree. After screening by a large number of experiments, the inventor finds that replacement of $LiPF_6$ with the lithium bis(fluorosulfonyl)imide (LiFSI) may improve the conductivity of the electrolyte solution, but single use of the LiFSI may accelerate corrosion of aluminum foil. However, the inventor finds that by using mixed salt of the $LiPF_6$ and the LiFSI together and limiting the ratio $$\frac{C1}{C2}$$

of the molar concentration C1 of the lithium bis(fluorosulfonyl)imide to the molar concentration C2 of the lithium hexafluorophosphate within the reasonable range, loss of the conductivity of the electrolyte solution caused by reduction of the quantity of the cyclic ester may be compensated, and the corrosion of the aluminum foil by the lithium salt may be effectively prevented, thus facilitating a further improvement of the high-temperature cycle performance and the high-temperature storage performance of the battery. For details, reference may be made to Table 3.

In some embodiments, $$\frac{C1}{C2}$$

may be selected from any numerical range formed by specific point values in Table 3.

In some embodiments, a sum of the molar concentrations of the lithium bis(fluorosulfonyl)imide and the lithium hexafluorophosphate is 0.86M-1.4M, optionally 1M-1.4M.

When the lithium salt has an excessively high concentration, the electrolyte solution has excessively high viscosity, which reduces the high-temperature cycle and high-temperature storage performances of the battery as well as the power performance thereof, and on the contrary, when the total concentration is excessively low, the effectively migrated lithium ions have an excessively low content, and the battery has poor high-temperature cycle and high-temperature storage performances, and therefore, the total concentration of the LiFSI and the $LiPF_6$ is further limited within the proper range. For details, reference may be made to Table 4.

In some embodiments, the sum of the molar concentrations of the lithium bis(fluorosulfonyl)imide and the lithium hexafluorophosphate may be selected from any numerical range formed by specific point values in Table 4.

In some embodiments, the electrolyte solution according to the present disclosure includes a film formation additive, and a mass fraction A of the film formation additive in the electrolyte solution and the mass fraction W2 of the cyclic ester in the electrolyte solution satisfy:

$$10 \leq \frac{W2}{5} + 2*A \leq 16.$$

Optionally, the film formation additive may be at least one of fluoroethylene carbonate (FEC), vinylene carbonate (VC), ethylene sulfate (DTD) and 1,3-propane sultone (PS).

The cyclic ester solvent may participate in film formation of the positive and negative electrodes in a formation process of the lithium ion battery, but if only the cyclic ester solvent is used to form the film, film formation quality is possibly insufficient, the good cycle performance of the battery cannot be maintained, and the film formation quality may be improved by using the cyclic ester solvent in combination with the film formation additive.

After statistics from a large number of experiments, in the present disclosure, when the mass fraction A of the film formation additive in the electrolyte solution and the mass fraction W2 of the cyclic ester in the electrolyte solution satisfy the relation in the present disclosure, the formed electrolyte solution may guarantee high-quality film formation of the positive and negative electrodes, and may also allow the cyclic ester matched with the film formation additive to exert a maximum effective effect (an overall improvement of the conductivity of the electrolyte solution), such that the lithium ion battery has good high-temperature cycle and high-temperature storage performances, and meanwhile has a good power performance. For details, reference may be made to Table 5.

In some embodiments, $$\frac{W2}{5}+2*A$$

may be selected from any numerical range formed by specific point values in Table 5, optionally a range of 11.9-13.5.

The lithium ion battery according to the present disclosure further includes a positive plate, a separator and a negative plate.

[Positive Plate]

The positive plate includes a positive current collector and a positive film provided on at least one surface of the positive current collector, the positive film including a positive active material.

As an example, the positive current collector has two surfaces opposite in a thickness direction thereof, and the positive film is provided on one or both of the two opposite surfaces of the positive current collector.

In some embodiments, metal foil or a composite current collector may be used as the positive current collector. For example, aluminum foil may be used as the metal foil. The composite current collector may include a high molecular material base layer and a metal layer formed on at least one surface of the high molecular material base layer. The composite current collector may be formed by forming a metal material (aluminum, an aluminum alloy, nickel, a nickel alloy, titanium, a titanium alloy, silver, a silver alloy, or the like) on the base layer of high molecular material (such as polypropylene (PP), polyethylene terephthalate (PET), polybutylene terephthalate (PBT), polystyrene (PS), polyethylene (PE), or the like).

In some embodiments, the positive active material may be a positive active material for a battery well known in the art. As an example, the positive active material may include at least one of the following materials: lithium-contained phosphate of an olivine structure, lithium transition metal oxide and respective modified compounds thereof. However, the present disclosure is not limited to these materials, and other conventional materials which may be used as the positive active material of the battery may be used. Only one of these positive active materials may be used, or more than two thereof are used in combination. Examples of the lithium transition metal oxide may include, but are not limited to, at least one of lithium cobalt oxide (for example, $LiCoO_2$), lithium nickel oxide (for example, $LiNiO_2$), lithium manganese oxide (for example, $LiMnO_2$, $LiMn_2O_4$), lithium nickel cobalt oxide, lithium manganese cobalt oxide, lithium nickel manganese oxide, lithium nickel cobalt manganese oxide (for example, $LiNi_{1/3}Co_{1/3}Mn_{1/3}O_2$ (also abbreviated as $NCM_{333}$), $LiNi_{0.5}Co_{0.2}Mn_{0.302}$ (also abbreviated as $NCM_{523}$), $LiNi_{0.5}Co_{0.25}Mn_{0.2502}$ (also abbreviated as $NCM_{211}$), $LiNi_{0.6}Co_{0.2}Mn_{0.2}O_2$ (also abbreviated as $NCM_{622}$), $LiNi_{0.8}Co_{0.1}Mn_{0.1}O_2$ (also abbreviated as $NCM_{811}$), lithium nickel cobalt aluminum oxide (for example, $LiNi_{0.8}Co_{0.15}Al_{0.05}O_2$), and modified compounds thereof, or the like. Examples of the lithium-contained phosphate of an olivine structure may include, but are not limited to, at least one of lithium iron phosphate (for example, $LiFePO_4$ (also abbreviated as LFP)), a composite material of lithium iron phosphate and carbon, lithium manganese phosphate (for example, $LiMnPO_4$), a composite material of lithium manganese phosphate and carbon, lithium iron manganese phosphate, and a composite material of lithium iron manganese phosphate and carbon.

In some embodiments, the positive film further optionally includes a binder. As an example, the binder may include at least one of polyvinylidene fluoride (PVDF), polytetrafluoroethylene (PTFE), a vinylidene fluoride-tetrafluoroethylene-propylene terpolymer, a vinylidene fluoride-hexafluoropropylene-tetrafluoroethyleneterpolymer, a tetrafluoroethylene-hexafluoropropylene copolymer, and fluorine-contained acrylate resin.

In some embodiments, the positive film further optionally includes a conductive agent. As an example, the conductive agent may include at least one of superconducting carbon, acetylene black, carbon black, Ketjen black, carbon dots, carbon nanotubes, graphene, and carbon nanofibers.

In some embodiments, the positive plate may be fabricated by: dispersing the above components for fabricating the positive plate, such as the positive active material, the conductive agent, the binder, and any other component, in a solvent (for example, N-methyl pyrrolidone) to form positive slurry; and coating the positive current collector with the positive slurry, and performing drying, cold pressing and other processes to obtain the positive plate.

[Negative Plate]

The negative plate includes a negative current collector and a negative film provided on at least one surface of the negative current collector, the negative film including a negative active material.

As an example, the negative current collector has two surfaces opposite in a thickness direction thereof, and the negative film is provided on one or both of the two opposite surfaces of the negative current collector.

In some embodiments, metal foil or a composite current collector may be used as the negative current collector. For example, copper foil may be used as the metal foil. The composite current collector may include a high molecular material base layer and a metal layer formed on at least one surface of the high molecular material base layer. The composite current collector may be formed by forming a metal material (copper, a copper alloy, nickel, a nickel alloy, titanium, a titanium alloy, silver, a silver alloy, or the like) on the base layer of high molecular material (such as polypropylene (PP), polyethylene terephthalate (PET), polybutylene terephthalate (PBT), polystyrene (PS), polyethylene (PE), or the like).

In some embodiments, the negative active material may be a negative active material for a battery well known in the art. As an example, the negative active material may include at least one of the following materials: artificial graphite, natural graphite, soft carbon, hard carbon, silicon-based materials, tin-based materials, lithium titanate, or the like. The silicon-based material may be at least one of elemental silicon, a silicon-oxygen compound, a silicon-carbon composite, a silicon-nitrogen composite, and a silicon alloy. The tin-based material may be at least one of elemental tin, a tin-oxide compound, and a tin alloy. However, the present disclosure is not limited to these materials, and other conventional materials which may be used as the negative active material of the battery may be used. Only one of these negative active materials may be used, or more than two thereof are used in combination.

In some embodiments, the negative film further optionally includes a binder. The binder may be at least one of styrene butadiene rubber (SBR), polyacrylicacid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

In some embodiments, the negative film further optionally includes a conductive agent. The conductive agent may be at least one of superconducting carbon, acetylene black, carbon black, Ketjen black, carbon dots, carbon nanotubes, graphene, and carbon nanofibers.

In some embodiments, the negative film may further optionally include other additives, such as a thickener (for example, sodium carboxymethyl cellulose (CMC-Na)), or the like.

In some embodiments, the negative plate may be fabricated by: dispersing the above components for fabricating the negative plate, such as the negative active material, the conductive agent, the binder, and any other component, in a solvent (for example, deionized water) to form negative slurry; and coating the negative current collector with the negative slurry, and performing drying, cold pressing and other processes to obtain the negative plate.

[Separator]

In some embodiments, the lithium ion battery further includes a separator. A type of the separator is not particularly limited in the present disclosure, and any well-known separator with a porous structure having good chemical stability and mechanical stability may be selected.

In some embodiments, the separator may be made of at least one of glass fibers, non-woven fabrics, polyethylene, polypropylene and polyvinylidene difluoride. The separator may be a single-layer film or a multi-layer composite film, which is not particularly limited. When the separator is a multi-layer composite film, respective layers may be made of same or different materials, which is not particularly limited.

In some embodiments, the positive plate, the negative plate and the separator may be manufactured into an electrode assembly with a winding process or a lamination process.

[Lithium Ion Battery]

The present disclosure further provides a lithium ion battery, including: the electrolyte solution according to the first aspect of the present disclosure.

In some embodiments, the lithium ion battery according to the present disclosure includes a positive plate and the electrolyte solution according to the first aspect of the present disclosure, the positive plate includes a positive material with a formula $LiNi_xCo_yMn_zO_2$, x+y+z=1, and the mass fraction W2 of the cyclic ester in the electrolyte solution and a nickel atom content x satisfy a relation:

$$0.5 \leq \frac{W2}{100x} \leq 0.72.$$

The lithium ion battery fabricated by the electrolyte solution in combination with the Ni—Co—Mn layered ternary positive active material in the present disclosure has a remarkably improved electrochemical performance, and the quantity of the cyclic ester in the electrolyte solution has an adaptive relation with the nickel atom content x in the ternary positive active material. Generally, the higher the nickel atom content in the ternary positive active material, the higher the activity of the corresponding ternary positive active material, but during use of the battery, the ternary positive active material with a high nickel atom content may intensify oxygen release on the surface of the positive electrode, thereby intensifying oxidative decomposition of the cyclic esters and other solvents. After a large number of experiments, the inventor of the present disclosure finds that when the quantity of the electrolyte solution according to the present disclosure and the nickel atom content x satisfy the certain adaptive relation, $$\text{i.e., } 0.5 \leq \frac{W2}{100x} \leq 0.72,$$

unexpected technical effects are achieved: the oxygen release problem of the high nickel battery may be improved effectively, the oxidative decomposition of the cyclic ester on the surface of the positive electrode may be slowed down effectively, and the corresponding ternary lithium ion battery has excellent cycle and power performances. For details, reference may be made to Table 6.

In some embodiments, the nickel ion content x may be more than 0.5, optionally 0.5, 0.65, 0.8 and 0.96. For details, reference may be made to Table 8.

The formula of the electrolyte solution according to the present disclosure is particularly suitable for the ternary lithium ion battery with a high nickel atom content, and even a ternary lithium ion battery with an ultrahigh nickel atom content also has the excellent high-temperature storage performance, high-temperature cycle performance and power performance.

In some embodiments, in the lithium ion battery according to the present disclosure, a loading quantity H (in g) of a negative material on a 1,540.25 $mm^2$ surface of a current collector and the mass fraction W2 of the cyclic ester in the electrolyte solution satisfy a relation:

$$20 \leq \frac{W2}{H} \leq 166,$$

optionally $$50 \leq \frac{W2}{H} \leq 141.$$

After a large number of experiments, the inventor of the present disclosure finds that the quantity of the cyclic ester in the electrolyte solution according to the present disclosure and the loading quantity H of the negative material have a synergistic effect, and when the quantity of the cyclic ester and the loading quantity satisfy the certain adaptive relation, i.e., $$20 \leq \frac{W2}{H} \leq 166,$$

the electrochemical performance of the whole lithium ion battery is remarkably improved. For details, reference may be made to Table 7.

In some embodiments, the lithium ion battery according to the present disclosure is a housing battery.

In some embodiments, the lithium ion battery may include an outer package. The outer package may be configured to encapsulate the electrode assembly and the electrolyte.

In some embodiments, the outer package of the lithium ion battery may be a hard shell, such as a hard plastic shell, an aluminum shell, a steel shell, or the like. The outer package of the lithium ion battery may also be a soft package, such as a bag-type soft package. The soft package may be made of plastic, such as polypropylene, polybutylene terephthalate, polybutylene succinate, or the like.

A shape of the lithium ion battery is not particularly limited in the present disclosure, and may be a cylindrical shape, a square shape, or any other shape. For example, FIG. 1 shows a lithium ion battery 5 of a square structure as an example.

Figure 2:
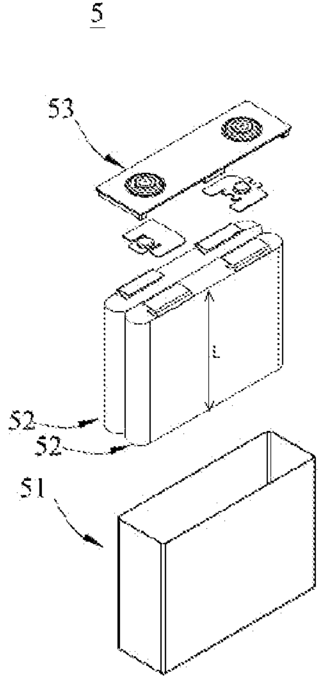
FIG. 2 is an exploded view of the lithium ion battery according to the embodiment of the present disclosure shown in FIG. 1.

In some embodiments, referring to FIG. 2, the outer package may include a housing 51 and a cover plate 53. The housing 51 may include a bottom plate and a side plate connected to the bottom plate, and the bottom plate and the side plate enclose an accommodating cavity. The housing 51 has an opening communicated with the accommodating cavity, and the cover plate 53 may cover the opening to close the accommodating cavity. The positive plate, the negative plate and the separator may form the electrode assembly 52 with a winding process or a lamination process. The electrode assembly 52 is encapsulated within the accommodating cavity. The electrolyte immerses the electrode assembly 52. One or more electrode assemblies 52 may be contained in the lithium ion battery 5, and those skilled in the art may make a choice according to specific practical requirements.

Figure 3:
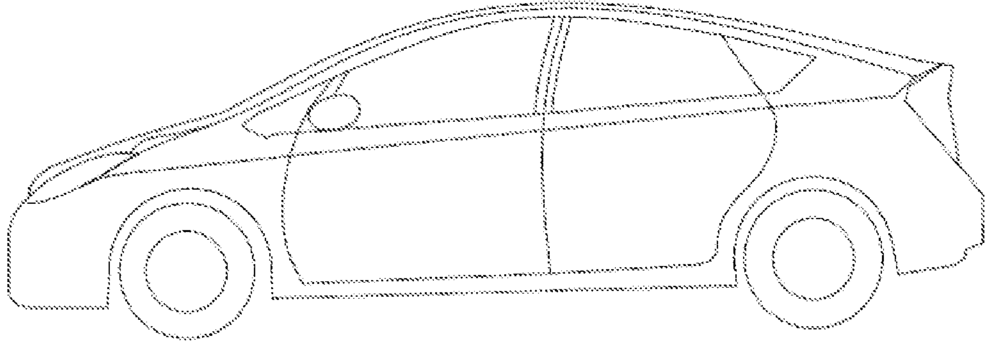
FIG. 3 is a schematic diagram of an electric device in which the lithium ion battery is used as a power source according to an embodiment of the present disclosure.

FIG. 3 shows an electric device as an example. The device is a battery electric vehicle, a hybrid electric vehicle, a plug-in hybrid electric vehicle, or the like.

EXAMPLE

Hereinafter, examples of the present disclosure will be described. The examples described below are illustrative, and merely used to explain the present disclosure. The examples shall not be construed to limit the present disclosure. If the specific technologies or conditions are not specified in the examples, a step will be performed in accordance with the techniques or conditions described in the literature in the art or in accordance with the product instructions. The reagents or instruments used in the present invention, the manufacturers of which are not indicated, are the commercially available conventional products usually used in the art. Contents of ingredients in the examples of the present disclosure are based on mass without crystal water, unless otherwise specified.

As descriptive terms, "electrolyte solution of example 1-1" refers to an electrolyte solution used in a fabrication process of the lithium ion battery of example 1-1; "positive plate of example 1-1" refers to a positive plate used in the fabrication process of the lithium ion battery of example 1-1; "negative plate of example 1-1" refers to a negative plate used in the fabrication process of the lithium ion battery of example 1-1; "separator of example 1-1" refers to a separator used in the fabrication process of the lithium ion battery of example 1-1; "lithium ion battery of example 1-1" refers to the lithium ion battery fabricated by the positive electrode, separator, negative electrode, and electrolyte solution of example 1-1.

Raw materials involved in the examples of the present disclosure are as follows:

- nickel-cobalt-manganese ternary material ($LiMO_2$, M is a Ni—Co—Mn solid solution, and specific proportions are detailed in the examples)
- artificial graphite (Guangdong Kaijin New Energy Technology Co., Ltd)
- N-methyl pyrrolidone (NMP, CAS: 872-50-4, Shanghai Macklin Biotechnology Co., Ltd)
- polyvinylidene fluoride (CAS: 24937-79-9, Shanghai Macklin Biotechnology Co., Ltd)
- acetylene black (Guangdong Kaijin New Energy Technology Co., Ltd)
- carbon black as conductive agent (Guangdong Kaijin New Energy Technology Co., Ltd)
- acrylate (CAS: 25067-02-1, Shanghai Macklin Biotechnology Co., Ltd)
- ethylene carbonate (EC, CAS: 96-49-1, Shanghai Macklin Biotechnology Co., Ltd)
- dimethyl carbonate (DMC, CAS: 616-38-6, Shanghai Macklin Biotechnology Co., Ltd)
- ethyl methyl carbonate (EMC, CAS: 623-53-0, Shanghai Macklin Biotechnology Co., Ltd)
- lithium hexafluorophosphate ($LiPF_6$, CAS: 21324-40-3, Guangzhou Tinci Materials Technology Co., Ltd)
- lithium bis(fluorosulfonyl)imide (LiFSI, CAS: 171611-11-3, Guangzhou Tinci Materials Technology Co., Ltd)
- fluoroethylene carbonate (FEC, CAS: 114435-02-8, Guangzhou Tinci Materials Technology Co., Ltd).

Example 1-1

[Preparation of Electrolyte Solution]

In an argon atmosphere glove box with a water content less than 10 ppm, 32.64 g of EC, 60.84 g of EMC, 6.25 g of $LiPF_6$ and 0.15 g of LiFSI were added into a beaker and fully stirred to be dissolved to obtain the electrolyte solution for the example.

[Fabrication of Positive Plate]

A positive active nickel-cobalt-manganese ternary material ($LiNi_{0.8}Co_{0.1}Mn_{0.1}O_2$), a binder (polyvinylidene fluoride) and a conductive agent (acetylene black) were mixed according to a mass ratio of 8:1:1, a solvent NMP was added, and positive slurry was obtained under the action of a vacuum stirrer; aluminum foil of a positive current collector with a thickness of 13 μm was uniformly coated with the positive slurry according to an amount of 0.28 g (dry weight)/1,540.25 mm$^2$; and the aluminum foil was aired at a room temperature, transferred to a 120° C. oven and dried for 1 h, and then, cold pressing and splitting were performed to obtain the positive plate.

[Fabrication of Negative Plate]

Artificial graphite, a conductive agent (carbon black) and a binder (acrylate) were mixed according to a mass ratio of 92:2:6, deionized water was added, and negative slurry was obtained under the action of the vacuum stirrer; copper foil of a negative current collector with a thickness of 8 μm was evenly coated with the negative slurry according to an amount of 0.18 g (dry weight)/1,540.25 mm$^2$; and the copper foil was aired at the room temperature, transferred to the 120° C. oven and dried for 1 h, and then, cold pressing and splitting were performed to obtain the negative plate.

[Separator]

The separator was purchased from Cellgard corporation and had a model cellgard2400.

[Fabrication of Lithium Ion Battery]

The positive plate, the separator and the negative plate were stacked in sequence, the separator was located between the positive plate and the negative plate to play an isolating role, and then, the positive plate, the separator and the negative plate were wound to obtain a bare cell; the bare cell with a capacity of 4.3 Ah was placed in outer packaging foil, 8.6 g of the above prepared electrolyte solution was injected into a dried battery, and vacuum encapsulation, standing, formation, shaping and other processes were performed to obtain the lithium ion battery.

Example 1-2

For the fabrication process of the lithium ion battery, reference was overall made to Example 1-1 except that the preparing step of the electrolyte solution was as follows: in the argon atmosphere glove box with a water content less than 10 ppm, 18.17 g of EC, 72.68 g of EMC, 9 g of $LiPF_6$ and 0.15 g of LiFSI were added into the beaker and fully stirred to be dissolved to obtain the electrolyte solution for the example.

Example 1-3

For the fabrication process of the lithium ion battery, reference was overall made to Example 1-1 except that the preparing step of the electrolyte solution was as follows: in the argon atmosphere glove box with a water content less than 10 ppm, 10.10 g of EC, 81.74 g of EMC, 8 g of $LiPF_6$ and 0.15 g of LiFSI were added into the beaker and fully stirred to be dissolved to obtain the electrolyte solution for the example.

Example 1-4

For the fabrication process of the lithium ion battery, reference was overall made to Example 1-1 except that the preparing step of the electrolyte solution was as follows: in the argon atmosphere glove box with a water content less than 10 ppm, 12.83 g of EC, 75.648 g of EMC, 11.38 g of $LiPF_6$ and 0.15 g of LiFSI were added into the beaker and fully stirred to be dissolved to obtain the electrolyte solution for the example.

Example 1-5

For the fabrication process of the lithium ion battery, reference was overall made to Example 1-1 except that the preparing step of the electrolyte solution was as follows: in the argon atmosphere glove box with a water content less than 10 ppm, 12.67 g of EC, 74.68 g of EMC, 12.5 g of $LiPF_6$ and 0.15 g of LiFSI were added into the beaker and fully stirred to be dissolved to obtain the electrolyte solution for the example.

Example 1-6

For the fabrication process of the lithium ion battery, reference was overall made to Example 1-1 except that the preparing step of the electrolyte solution was as follows: in the argon atmosphere glove box with a water content less than 10 ppm, 9.86 g of EC, 79.74 g of EMC, 10.25 g of $LiPF_6$ and 0.15 g of LiFSI were added into the beaker and fully stirred to be dissolved to obtain the electrolyte solution for the example.

Comparative Example 1

For the fabrication process of the lithium ion battery, reference was overall made to Example 1-1 except that the preparing step of the electrolyte solution was as follows: in the argon atmosphere glove box with a water content less than 10 ppm, 82.98 g of EC, 4.37 g of EMC, 12.5 g of $LiPF_6$ and 0.15 g of LiFSI were added into the beaker and fully stirred to be dissolved to obtain the electrolyte solution for the example.

Comparative Example 2

For the fabrication process of the lithium ion battery, reference was overall made to Example 1-1 except that the preparing step of the electrolyte solution was as follows: in the argon atmosphere glove box with a water content less than 10 ppm, 10.44 g of EC, 78.03 g of EMC, 11.38 g of $LiPF_6$ and 0.15 g of LiFSI were added into the beaker and fully stirred to be dissolved to obtain the electrolyte solution for the example.

Example 2-1

For the fabrication process of the lithium ion battery, reference was overall made to Example 1-1 except that the preparing step of the electrolyte solution was as follows: in the argon atmosphere glove box with a water content less than 10 ppm, 2.93 g of PC, 94.67 g of EMC, 2.25 g of $LiPF_6$ and 0.15 g of LiFSI were added into the beaker and fully stirred to be dissolved to obtain the electrolyte solution for the example.

Example 2-2

For the fabrication process of the lithium ion battery, reference was overall made to Example 1-1 except that the preparing step of the electrolyte solution was as follows: in the argon atmosphere glove box with a water content less than 10 ppm, 4.80 g of PC, 91.29 g of EMC, 3.75 g of $LiPF_6$ and 0.15 g of LiFSI were added into the beaker and fully stirred to be dissolved to obtain the electrolyte solution for the example.

Example 2-3

For the fabrication process of the lithium ion battery, reference was overall made to Example 1-1 except that the preparing step of the electrolyte solution was as follows: in the argon atmosphere glove box with a water content less than 10 ppm, 7.51 g of PC, 86.34 g of EMC, 6 g of $LiPF_6$ and 0.15 g of LiFSI were added into the beaker and fully stirred to be dissolved to obtain the electrolyte solution for the example.

Example 2-4

For the fabrication process of the lithium ion battery, reference was overall made to Example 1-1 except that the preparing step of the electrolyte solution was as follows: in the argon atmosphere glove box with a water content less than 10 ppm, 9.25 g of PC, 83.22 g of EMC, 7.38 g of $LiPF_6$ and 0.15 g of LiFSI were added into the beaker and fully stirred to be dissolved to obtain the electrolyte solution for the example.

Example 2-5

For the fabrication process of the lithium ion battery, reference was overall made to Example 1-1 except that the preparing step of the electrolyte solution was as follows: in the argon atmosphere glove box with a water content less than 10 ppm, 11.76 g of PC, 78.71 g of EMC, 9.38 g of $LiPF_6$ and 0.15 g of LiFSI were added into the beaker and fully stirred to be dissolved to obtain the electrolyte solution for the example.

Example 2-6

For the fabrication process of the lithium ion battery, reference was overall made to Example 1-1 except that the preparing step of the electrolyte solution was as follows: in the argon atmosphere glove box with a water content less than 10 ppm, 13.38 g of PC, 75.84 g of EMC, 10.63 g of $LiPF_6$ and 0.15 g of LiFSI were added into the beaker and fully stirred to be dissolved to obtain the electrolyte solution for the example.

Example 2-7

For the fabrication process of the lithium ion battery, reference was overall made to Example 1-1 except that the preparing step of the electrolyte solution was as follows: in the argon atmosphere glove box with a water content less than 10 ppm, 15.72 g of PC, 71.62 g of EMC, 12.5 g of $LiPF_6$ and 0.15 g of LiFSI were added into the beaker and fully stirred to be dissolved to obtain the electrolyte solution for the example.

Example 2-8

For the fabrication process of the lithium ion battery, reference was overall made to Example 1-1 except that the preparing step of the electrolyte solution was as follows: in the argon atmosphere glove box with a water content less than 10 ppm, 17.22 g of PC, 68.88 g of EMC, 13.75 g of $LiPF_6$ and 0.15 g of LiFSI were added into the beaker and fully stirred to be dissolved to obtain the electrolyte solution for the example.

Example 3-1

For the fabrication process of the lithium ion battery, reference was overall made to Example 1-1 except that the preparing step of the electrolyte solution was as follows: in the argon atmosphere glove box with a water content less than 10 ppm, 13.92 g of EC, 73.55 g of EMC, 12.38 g of $LiPF_6$ and 0.15 g of LiFSI were added into the beaker and fully stirred to be dissolved to obtain the electrolyte solution for the example.

Example 3-2

For the fabrication process of the lithium ion battery, reference was overall made to Example 1-1 except that the preparing step of the electrolyte solution was as follows: in the argon atmosphere glove box with a water content less than 10 ppm, 14.04 g of EC, 73.32 g of EMC, 11.90 g of $LiPF_6$ and 0.73 g of LiFSI were added into the beaker and fully stirred to be dissolved to obtain the electrolyte solution for the example.

Example 3-3

For the fabrication process of the lithium ion battery, reference was overall made to Example 1-1 except that the preparing step of the electrolyte solution was as follows: in the argon atmosphere glove box with a water content less than 10 ppm, 15.5 g of EC, 70.55 g of EMC, 6.25 g of $LiPF_6$ and 7.7 g of LiFSI were added into the beaker and fully stirred to be dissolved to obtain the electrolyte solution for the example.

Example 3-4

For the fabrication process of the lithium ion battery, reference was overall made to Example 1-1 except that the preparing step of the electrolyte solution was as follows: in the argon atmosphere glove box with a water content less than 10 ppm, 15.82 g of EC, 69.94 g of EMC, 5 g of $LiPF_6$ and 9.24 g of LiFSI were added into the beaker and fully stirred to be dissolved to obtain the electrolyte solution for the example.

Example 3-5

For the fabrication process of the lithium ion battery, reference was overall made to Example 1-1 except that the preparing step of the electrolyte solution was as follows: in the argon atmosphere glove box with a water content less than 10 ppm, 16.04 g of EC, 69.53 g of EMC, 4.17 g of $LiPF_6$ and 10.27 g of LiFSI were added into the beaker and fully stirred to be dissolved to obtain the electrolyte solution for the example.

Example 3-6

For the fabrication process of the lithium ion battery, reference was overall made to Example 1-1 except that the preparing step of the electrolyte solution was as follows: in the argon atmosphere glove box with a water content less than 10 ppm, 16.39 g of EC, 68.85 g of EMC, 2.78 g of $LiPF_6$ and 11.98 g of LiFSI were added into the beaker and fully stirred to be dissolved to obtain the electrolyte solution for the example.

Example 3-7

For the fabrication process of the lithium ion battery, reference was overall made to Example 1-1 except that the preparing step of the electrolyte solution was as follows: in the argon atmosphere glove box with a water content less than 10 ppm, 16.57 g of EC, 68.51 g of EMC, 2.08 g of $LiPF_6$ and 12.83 g of LiFSI were added into the beaker and fully stirred to be dissolved to obtain the electrolyte solution for the example.

Example 3-8

For the fabrication process of the lithium ion battery, reference was overall made to Example 1-1 except that the preparing step of the electrolyte solution was as follows: in the argon atmosphere glove box with a water content less than 10 ppm, 16.62 g of EC, 68.43 g of EMC, 1.92 g of $LiPF_6$ and 13.03 g of LiFSI were added into the beaker and fully stirred to be dissolved to obtain the electrolyte solution for the example.

Example 4-1

For the fabrication process of the lithium ion battery, reference was overall made to Example 1-1 except that the preparing step of the electrolyte solution was as follows: in the argon atmosphere glove box with a water content less than 10 ppm, 10.85 g of EC, 79.39 g of EMC, 4.38 g of $LiPF_6$ and 5.39 g of LiFSI were added into the beaker and fully stirred to be dissolved to obtain the electrolyte solution for the example.

Example 4-2

For the fabrication process of the lithium ion battery, reference was overall made to Example 1-1 except that the preparing step of the electrolyte solution was as follows: in the argon atmosphere glove box with a water content less than 10 ppm, 13.18 g of EC, 74.97 g of EMC, 5.31 g of $LiPF_6$ and 6.55 g of LiFSI were added into the beaker and fully stirred to be dissolved to obtain the electrolyte solution for the example.

Example 4-3

For the fabrication process of the lithium ion battery, reference was overall made to Example 1-1 except that the preparing step of the electrolyte solution was as follows: in the argon atmosphere glove box with a water content less than 10 ppm, 15.5 g of EC, 70.55 g of EMC, 6.25 g of $LiPF_6$ and 7.70 g of LiFSI were added into the beaker and fully stirred to be dissolved to obtain the electrolyte solution for the example.

Example 4-4

For the fabrication process of the lithium ion battery, reference was overall made to Example 1-1 except that the preparing step of the electrolyte solution was as follows: in the argon atmosphere glove box with a water content less than 10 ppm, 21.7 g of EC, 58.77 g of EMC, 8.75 g of $LiPF_6$ and 10.78 g of LiFSI were added into the beaker and fully stirred to be dissolved to obtain the electrolyte solution for the example.

Example 4-5

For the fabrication process of the lithium ion battery, reference was overall made to Example 1-1 except that the preparing step of the electrolyte solution was as follows: in the argon atmosphere glove box with a water content less than 10 ppm, 22.48 g of EC, 57.3 g of EMC, 9.06 g of $LiPF_6$ and 11.17 g of LiFSI were added into the beaker and fully stirred to be dissolved to obtain the electrolyte solution for the example.

Example 5-1

For the fabrication process of the lithium ion battery, reference was overall made to Example 1-1 except that the preparing step of the electrolyte solution was as follows: in the argon atmosphere glove box with a water content less than 10 ppm, 12.30 g of EC, 72.55 g of EMC, 11.44 g of $LiPF_6$, 0.15 g of LiFSI and 3.55 g of FEC were added into the beaker and fully stirred to be dissolved to obtain the electrolyte solution for the example.

Example 5-2

For the fabrication process of the lithium ion battery, reference was overall made to Example 1-1 except that the preparing step of the electrolyte solution was as follows: in the argon atmosphere glove box with a water content less than 10 ppm, 10.35 g of EC, 75.87 g of EMC, 9.63 g of $LiPF_6$, 0.15 g of LiFSI and 4 g of FEC were added into the beaker and fully stirred to be dissolved to obtain the electrolyte solution for the example.

Example 5-3

For the fabrication process of the lithium ion battery, reference was overall made to Example 1-1 except that the preparing step of the electrolyte solution was as follows: in the argon atmosphere glove box with a water content less than 10 ppm, 12.51 g of EC, 70.89 g of EMC, 11.75 g of $LiPF_6$, 0.15 g of LiFSI and 4.7 g of FEC were added into the beaker and fully stirred to be dissolved to obtain the electrolyte solution for the example.

Example 5-4

For the fabrication process of the lithium ion battery, reference was overall made to Example 1-1 except that the preparing step of the electrolyte solution was as follows: in the argon atmosphere glove box with a water content less than 10 ppm, 10.76 g of EC, 73.31 g of EMC, 10.13 g of $LiPF_6$, 0.15 g of LiFSI and 5.65 g of FEC were added into the beaker and fully stirred to be dissolved to obtain the electrolyte solution for the example.

Example 5-5

For the fabrication process of the lithium ion battery, reference was overall made to Example 1-1 except that the preparing step of the electrolyte solution was as follows: in the argon atmosphere glove box with a water content less than 10 ppm, 11.03 g of EC, 71.29 g of EMC, 10.63 g of $LiPF_6$, 0.15 g of LiFSI and 6.9 g of FEC were added into the beaker and fully stirred to be dissolved to obtain the electrolyte solution for the example.

Example 5-6

For the fabrication process of the lithium ion battery, reference was overall made to Example 1-1 except that the preparing step of the electrolyte solution was as follows: in the argon atmosphere glove box with a water content less than 10 ppm, 13.55 g of EC, 66.17 g of EMC, 13.13 g of $LiPF_6$, 0.15 g of LiFSI and 7 g of FEC were added into the beaker and fully stirred to be dissolved to obtain the electrolyte solution for the example.

Example 6-1

For the fabrication process of the lithium ion battery, reference was overall made to Example 1-1 except that the positive active ternary material adopted in the example was $LiNi_{0.99}Co_{0.005}Mn_{0.005}O_2$. In addition, the preparing step of the electrolyte solution was as follows: in the argon atmosphere glove box with a water content less than 10 ppm, 46.286 g of EC, 39.43 g of EMC, 4.13 g of $LiPF_6$ and 10.16 g of LiFSI were added into the beaker and fully stirred to be dissolved to obtain the electrolyte solution for the example.

Example 6-2

For the fabrication process of the lithium ion battery, reference was overall made to Example 1-1 except that the positive active ternary material adopted in the example was $LiNi_{0.69}Co_{0.16}Mn_{0.15}O_2$.

In addition, the preparing step of the electrolyte solution was as follows: in the argon atmosphere glove box with a water content less than 10 ppm, 34.28 g of EC, 51.43 g of EMC, 4.13 g of $LiPF_6$ and 10.16 g of LiFSI were added into the beaker and fully stirred to be dissolved to obtain the electrolyte solution for the example.

Example 6-3

For the fabrication process of the lithium ion battery, reference was overall made to Example 1-1 except that the positive active ternary material adopted in the example was $LiNi_{0.47}Co_{0.15}Mn_{0.38}O_2$.

In addition, the preparing step of the electrolyte solution was as follows: in the argon atmosphere glove box with a water content less than 10 ppm, 27.86 g of EC, 57.85 g of EMC, 4.13 g of $LiPF_6$ and 10.16 g of LiFSI were added into the beaker and fully stirred to be dissolved to obtain the electrolyte solution for the example.

Example 6-4

For the fabrication process of the lithium ion battery, reference was overall made to Example 1-1 except that the positive active ternary material adopted in the example was $LiNi_{0.32}Co_{0.19}Mn_{0.57}O_2$.

In addition, the preparing step of the electrolyte solution was as follows: in the argon atmosphere glove box with a water content less than 10 ppm, 23.14 g of EC, 62.57 g of EMC, 4.13 g of $LiPF_6$ and 10.16 g of LiFSI were added into the beaker and fully stirred to be dissolved to obtain the electrolyte solution for the example.

Example 6-5

For the fabrication process of the lithium ion battery, reference was overall made to Example 1-1 except that the positive active ternary material adopted in the example was $LiNi_{0.25}Co_{0.18}Mn_{0.57}O_2$. In addition, the preparing step of the electrolyte solution was as follows: in the argon atmosphere glove box with a water content less than 10 ppm, 20.06 g of EC, 65.65 g of EMC, 4.13 g of $LiPF_6$ and 10.16 g of LiFSI were added into the beaker and fully stirred to be dissolved to obtain the electrolyte solution for the example.

Example 7-1

For the fabrication process of the lithium ion battery, reference was overall made to Example 1-1 except that the negative coating amount was 1.698 mg/1,540.25 $mm^2$ in the example, and in addition, the preparing step of the electrolyte solution was as follows: in the argon atmosphere glove box with a water content less than 10 ppm, 30.57 g of EC, 63.31 g of EMC and 6.11 g of $LiPF_6$ were added into the beaker and fully stirred to be dissolved to obtain the electrolyte solution for the example.

Example 7-2

For the fabrication process of the lithium ion battery, reference was overall made to Example 1-1 except that the negative coating amount was 0.873 mg/1,540.25 $mm^2$ in the example, and in addition, the preparing step of the electrolyte solution was as follows: in the argon atmosphere glove box with a water content less than 10 ppm, 17.47 g of EC, 73.80 g of EMC and 8.73 g of $LiPF_6$ were added into the beaker and fully stirred to be dissolved to obtain the electrolyte solution for the example.

Example 7-3

For the fabrication process of the lithium ion battery, reference was overall made to Example 1-1 except that the negative coating amount was 0.192 mg/1,540.25 $mm^2$ in the example, and in addition, the preparing step of the electrolyte solution was as follows: in the argon atmosphere glove box with a water content less than 10 ppm, 9.61 g of EC, 82.71 g of EMC and 7.69 g of $LiPF_6$ were added into the beaker and fully stirred to be dissolved to obtain the electrolyte solution for the example.

Example 7-4

For the fabrication process of the lithium ion battery, reference was overall made to Example 1-1 except that the negative coating amount was 0.158 mg/1,540.25 $mm^2$ in the example, and in addition, the preparing step of the electrolyte solution was as follows: in the argon atmosphere glove box with a water content less than 10 ppm, 12.67 g of EC, 75.94 g of EMC and 11.4 g of $LiPF_6$ were added into the beaker and fully stirred to be dissolved to obtain the electrolyte solution for the example.

Example 7-5

For the fabrication process of the lithium ion battery, reference was overall made to Example 1-1 except that the negative coating amount was 0.115 mg/1,540.25 $mm^2$ in the example, and in addition, the preparing step of the electrolyte solution was as follows: in the argon atmosphere glove box with a water content less than 10 ppm, 12.67 g of EC, 74.67 g of EMC and 12.67 g of $LiPF_6$ were added into the beaker and fully stirred to be dissolved to obtain the electrolyte solution for the example.

Example 7-6

For the fabrication process of the lithium ion battery, reference was overall made to Example 1-1 except that the negative coating amount was 0.09 mg/1,540.25 $mm^2$ in the example, and in addition, the preparing step of the electrolyte solution was as follows: in the argon atmosphere glove box with a water content less than 10 ppm, 12.67 g of EC, 74.67 g of EMC and 12.67 g of $LiPF_6$ were added into the beaker and fully stirred to be dissolved to obtain the electrolyte solution for the example.

Example 7-7

For the fabrication process of the lithium ion battery, reference was overall made to Example 1-1 except that the negative coating amount was 0.079 mg/1,540.25 $mm^2$ in the example, and in addition, the preparing step of the electrolyte solution was as follows: in the argon atmosphere glove box with a water content less than 10 ppm, 12.67 g of EC, 74.67 g of EMC and 12.67 g of $LiPF_6$ were added into the beaker and fully stirred to be dissolved to obtain the electrolyte solution for the example.

Example 7-8

For the fabrication process of the lithium ion battery, reference was overall made to Example 1-1 except that the negative coating amount was 0.058 mg/1,540.25 $mm^2$ in the example, and in addition, the preparing step of the electrolyte solution was as follows: in the argon atmosphere glove box with a water content less than 10 ppm, 9.61 g of EC, 80.3 g of EMC and 10.09 g of $LiPF_6$ were added into the beaker and fully stirred to be dissolved to obtain the electrolyte solution for the example.

Example 8-1

For the fabrication process of the lithium ion battery, reference was overall made to Example 1-1 except that the positive active ternary material adopted in the example was $LiNi_{0.5}Co_{0.2}Mn_{0.3}O_2$.

In addition, the preparing step of the electrolyte solution was as follows: in the argon atmosphere glove box with a water content less than 10 ppm, 16 g of EC, 69.6 g of EMC and 14.4 g of $LiPF_6$ were added into the beaker and fully stirred to be dissolved to obtain the electrolyte solution for the example.

Example 8-2

For the fabrication process of the lithium ion battery, reference was overall made to Example 1-1 except that the positive active ternary material adopted in the example was $LiNi_{0.65}Co_{0.05}Mn_{0.3}O_2$.

In addition, the preparing step of the electrolyte solution was as follows: in the argon atmosphere glove box with a water content less than 10 ppm, 16 g of EC, 69.6 g of EMC and 14.4 g of $LiPF_6$ were added into the beaker and fully stirred to be dissolved to obtain the electrolyte solution for the example.

Example 8-3

For the fabrication process of the lithium ion battery, reference was overall made to Example 1-1 except that the positive active ternary material adopted in the example was $LiNi_{0.8}5Co_{0.05}Mn_{0.1}O_2$.

In addition, the preparing step of the electrolyte solution was as follows: in the argon atmosphere glove box with a water content less than 10 ppm, 16 g of EC, 69.6 g of EMC and 14.4 g of $LiPF_6$ were added into the beaker and fully stirred to be dissolved to obtain the electrolyte solution for the example.

Example 8-4

For the fabrication process of the lithium ion battery, reference was overall made to Example 1-1 except that the positive active ternary material adopted in the example was $LiNi_{0.96}Co_{0.02}Mn_{0.02}O_2$.

In addition, the preparing step of the electrolyte solution was as follows: in the argon atmosphere glove box with a water content less than 10 ppm, 16 g of EC, 69.6 g of EMC and 14.4 g of $LiPF_6$ were added into the beaker and fully stirred to be dissolved to obtain the electrolyte solution for the example.

[Related Parameter and Battery Performance Test]

1. Initial Discharge Directive Current Resistance (DCR) Test

At 25° C., the lithium ion batteries of the above examples and comparative examples were charged to 4.25V at a charge rate of 1C, then charged to a current less than 0.05C at a constant voltage, and then discharged at a discharge rate of 1C for 30 min, and at this point, the SOC of the batteries was 50%, and a voltage at this point was recorded as V1; and then, the batteries were discharged for 30 s at a discharge rate of 4C (a corresponding current at 4C was I), and a voltage at this point was recorded as V2, initial discharge DCR of the lithium ion batteries was (V1−V2)/I, and specific values are shown in Tables 1-8.

2. 60° C. Cycle Performance Test

At 60° C., the battery was charged to 4.25V at a constant current of 1C, and then charged to a current of 0.05C at a constant voltage of 4.25V, stood for 5 min, and was then discharged to 2.5V at a constant current of 1C, and an obtained capacity was recorded as an initial capacity $C_0$. The above step was repeated for the same battery, counting was started at the same time, a discharge capacity $C_{300}$ of the battery after 300 cycles was recorded, and then, a cycle capacity conservation rate P of the battery after 300 cycles was $C_{300}/C_0*100\%$.

The lithium ion batteries of the examples and comparative examples were tested according to the above process, and specific values are shown in Tables 1-8.

3. 60° C. Storage Performance Test

At 25° C., the battery was charged to 4.25V at a constant current of 0.5C, and then charged to a current of 0.05C at a constant voltage of 4.25V, stood for 5 min, and was then discharged to 2.5V at a constant current of 0.5C, and a discharge capacity at this point was recorded as an initial capacity $C_0$.

The above battery was further charged to 4.25V at a constant current of 0.5C, then charged to a current of 0.05C at a constant voltage of 4.25V, and then placed in a 60° C. thermostat, stored for 60 days and then taken out. The taken-out battery was placed in a 25° C. atmospheric environment, and after the temperature the lithium ion battery was completely reduced to 25° C., the lithium ion battery was discharged to 2.5V at a constant current of 0.5C, then charged to 4.25V at a constant current of 0.5C, and finally discharged to 2.5V at a constant current of 0.5V, a discharge capacity at this point was C1, and a high-temperature storage capacity conservation rate M of the battery after 60-day storage was $C1/C_0\times100\%$.

The lithium ion batteries of other examples and comparative examples were tested according to the above process, and specific values are shown in Tables 1-8.

TABLE 1

Influence of relative ratio of lithium salt to cyclic ester on battery performance

| | Related parameters of electrolyte solution | | | | | | Battery performance | | |
|---|---|---|---|---|---|---|---|---|---|
| Number | Lithium salt | Cyclicester | W1 (%) | W2 (%) | $\frac{W1}{W2}$ | B (%) | 60° C. cycle capacity conservation rate P (%) | 60° C. storage capacity conservation rate M (%) | Initial DCR (mΩ) |
| Example 1-1 | LiFSI + $LiPF_6$ | EC | 6.40 | 32.68 | 0.2 | 35 | 75.6 | 81.2 | 20.5 |
| Example 1-2 | LiFSI + $LiPF_6$ | EC | 9.15 | 18.17 | 0.5 | 20 | 79.1 | 84.1 | 19.9 |
| Example 1-3 | LiFSI + $LiPF_6$ | EC | 8.15 | 10.10 | 0.81 | 11 | 84.3 | 88.7 | 18.8 |
| Example 1-4 | LiFSI + $LiPF_6$ | EC | 11.53 | 12.83 | 0.9 | 14.5 | 86.1 | 90.1 | 16.5 |

TABLE 1-continued

Influence of relative ratio of lithium salt to cyclic ester on battery performance

| Number | Lithium salt | Cyclicester | W1 (%) | W2 (%) | $\frac{W1}{W2}$ | B (%) | 60° C. cycle capacity conservation rate P (%) | 60° C. storage capacity conservation rate M (%) | Initial DCR (mΩ) |
|---|---|---|---|---|---|---|---|---|---|
| | Related parameters of electrolyte solution | | | | | | Battery performance | | |
| Example 1-5 | LiFSI + $LiPF_6$ | EC | 12.65 | 12.67 | 1.0 | 14.5 | 82.1 | 87.3 | 17.1 |
| Example 1-6 | LiFSI + $LiPF_6$ | EC | 10.4 | 9.86 | 1.06 | 11 | 79.9 | 83.3 | 17.4 |
| Comparative Example 1 | LiFSI + $LiPF_6$ | EC | 12.65 | 82.98 | 0.15 | 95 | 71.5 | 76.5 | 27.5 |
| Comparative Example 2 | LiFSI + $LiPF_6$ | EC | 11.53 | 10.44 | 1.1 | 11.8 | 72.8 | 77.8 | 23.4 |

Note
W1: mass fraction of lithium salt in electrolyte solution;
W2: mass fraction of cyclic ester in electrolyte solution;
B: mass fraction of cyclic ester in organic solvent

TABLE 2

Influence of content of cyclic ester in organic solvent on battery performance

| Number | Lithium salt | Cyclicester | W1 (%) | W2 (%) | $\frac{W1}{W2}$ | B (%) | 60° C. cycle capacity conservation rate (%) | 60° C. storage capacity conservation rate (%) | Initial DCR (mΩ) |
|---|---|---|---|---|---|---|---|---|---|
| | Related parameters of electrolyte solution | | | | | | Battery performance | | |
| Example 2-1 | LiFSI + $LiPF_6$ | PC | 2.4 | 2.93 | 0.82 | 3 | 74.7 | 79.1 | 18.1 |
| Example 2-2 | LiFSI + $LiPF_6$ | PC | 3.9 | 4.8 | 0.81 | 5 | 75.8 | 81.1 | 17.2 |
| Example 2-3 | LiFSI + $LiPF_6$ | PC | 6.15 | 7.51 | 0.82 | 8 | 79.8 | 82.6 | 16.5 |
| Example 2-4 | LiFSI + $LiPF_6$ | PC | 7.53 | 9.25 | 0.81 | 10 | 81.8 | 83.7 | 16.1 |
| Example 2-5 | LiFSI + $LiPF_6$ | PC | 9.53 | 11.76 | 0.81 | 13 | 84.1 | 87.1 | 15.1 |
| Example 2-6 | LiFSI + $LiPF_6$ | PC | 10.78 | 13.38 | 0.81 | 15 | 82.9 | 85.1 | 14.3 |
| Example 2-7 | LiFSI + $LiPF_6$ | PC | 12.65 | 15.72 | 0.8 | 18 | 80.7 | 82.1 | 15.7 |
| Example 2-8 | LiFSI + $LiPF_6$ | PC | 13.9 | 17.22 | 0.81 | 20 | 73.9 | 78.9 | 20.1 |

TABLE 3

Influence of relative content of different lithium salt on battery performance

| Number | Lithium salt | Cyclicester | $\frac{W1}{W2}$ | $\frac{C1}{C2}$ | [C1 + C2] (M) | 60° C. cycle capacity conservation rate (%) | 60° C. storage capacity conservation rate (%) | Initial DCR (mΩ) |
|---|---|---|---|---|---|---|---|---|
| | Related parameters of electrolyte solution | | | | | Battery performance | | |
| Example 3-1 | LiFSI + $LiPF_6$ | EC | 0.9 | 0.01 | 1 | 76.8 | 80.3 | 17.1 |
| Example 3-2 | LiFSI + $LiPF_6$ | EC | 0.9 | 0.05 | 1 | 78.5 | 81.4 | 16.9 |
| Example 3-3 | LiFSI + $LiPF_6$ | EC | 0.9 | 1 | 1 | 83.1 | 82.7 | 16.3 |

TABLE 3-continued

Influence of relative content of different lithium salt on battery performance

| Number | Lithium salt | Cyclicester | $\frac{W1}{W2}$ | $\frac{C1}{C2}$ | [C1 + C2] (M) | Battery performance: 60° C. cycle capacity conservation rate (%) | 60° C. storage capacity conservation rate (%) | Initial DCR (mΩ) |
|---|---|---|---|---|---|---|---|---|
| Example 3-4 | LiFSI + $LiPF_6$ | EC | 0.9 | 1.5 | 1 | 84.1 | 84.1 | 15.9 |
| Example 3-5 | LiFSI + $LiPF_6$ | EC | 0.9 | 2 | 1 | 85.4 | 88.2 | 15.6 |
| Example 3-6 | LiFSI + $LiPF_6$ | EC | 0.9 | 3.5 | 1 | 83.2 | 86.4 | 16.4 |
| Example 3-7 | LiFSI + $LiPF_6$ | EC | 0.9 | 5 | 1 | 80.1 | 84.1 | 16.9 |
| Example 3-8 | LiFSI + $LiPF_6$ | EC | 0.9 | 5.5 | 1 | 75.8 | 81.0 | 17.2 |

Note
C1: molar concentration of lithium bis(fluorosulfonyl)imide;
C2: molar concentration of lithium hexafluorophosphate

TABLE 4

Influence of total concentration of lithium salt on battery performance

| Number | Lithium salt | Cyclicester | $\frac{W1}{W2}$ | $\frac{C1}{C2}$ | [C1 + C2] (M) | Battery performance: 60° C. cycle capacity conservation rate (%) | 60° C. storage capacity conservation rate (%) | Initial DCR (mΩ) |
|---|---|---|---|---|---|---|---|---|
| Example 4-1 | LiFSI + $LiPF_6$ | EC | 0.9 | 1 | 0.7 | 77.8 | 79.9 | 17.9 |
| Example 4-2 | LiFSI + $LiPF_6$ | EC | 0.9 | 1 | 0.86 | 81.5 | 82.3 | 17.0 |
| Example 4-3 | LiFSI + $LiPF_6$ | EC | 0.9 | 1 | 1 | 83.1 | 82.7 | 16.3 |
| Example 4-4 | LiFSI + $LiPF_6$ | EC | 0.9 | 1 | 1.4 | 82.1 | 83.1 | 15.9 |
| Example 4-5 | LiFSI + $LiPF_6$ | EC | 0.9 | 1 | 1.46 | 78.1 | 80.1 | 17.2 |

TABLE 5

Influence of $\left[\frac{W2}{5}+2*A\right]$ on battery performance

| Number | Lithium salt | Cyclic-ester | A (%) | W2 (%) | $\frac{W1}{W2}$ | Film formation additive | $\frac{W2}{5}+2*A$ | Battery performance: 60° C. cycle capacity conserva-tion rate (%) | 60° C. storage capacity conserva-tion rate (%) | Initial DCR (mΩ) |
|---|---|---|---|---|---|---|---|---|---|---|
| Example 5-1 | LiFSI + $LiPF_6$ | EC | 3.55 | 12.30 | 0.94 | FEC | 9.56 | 82.1 | 83.4 | 17.4 |
| Example 5-2 | LiFSI + $LiPF_6$ | EC | 4 | 10.35 | 0.95 | FEC | 10.07 | 83.1 | 84.3 | 16.5 |
| Example 5-3 | LiFSI + $LiPF_6$ | EC | 4.7 | 12.51 | 0.95 | FEC | 11.90 | 84.1 | 85.3 | 16.1 |
| Example 5-4 | LiFSI + $LiPF_6$ | EC | 5.65 | 10.76 | 0.96 | FEC | 13.45 | 85.3 | 86.5 | 15.5 |
| Example 5-5 | LiFSI + $LiPF_6$ | EC | 6.9 | 11.03 | 0.98 | FEC | 16.00 | 84.6 | 84.3 | 16.5 |

TABLE 5-continued

Influence of $\left[\frac{W2}{5}+2*A\right]$ on battery performance

| Number | Lithium salt | Cyclic-ester | A (%) | W2 (%) | $\frac{W1}{W2}$ | Film formation additive | $\frac{W2}{5}+2*A$ | 60° C. cycle capacity conservation rate (%) | 60° C. storage capacity conservation rate (%) | Initial DCR (mΩ) |
|---|---|---|---|---|---|---|---|---|---|---|
| | Related parameters of electrolyte solution | | | | | | | Battery performance | | |
| Example 5-6 | LiFSI + $LiPF_6$ | EC | 7 | 13.55 | 0.98 | FEC | 16.71 | 82 | 82.4 | 17.3 |

Note
A: mass fraction of film formation additive in electrolyte solution;

TABLE 6

Influence of other parameters in battery on battery performance

| Number | Lithium salt | Cyclicester | 100x | W2 (%) | $\frac{W1}{W2}$ | $\frac{W2}{100x}$ | 60° C. cycle capacity conservation rate (%) | 60° C. storage capacity conservation rate (%) | Initial DCR (mΩ) |
|---|---|---|---|---|---|---|---|---|---|
| | Related performance of battery | | | | | | Battery performance | | |
| Example 6-1 | LiFSI + $LiPF_6$ | EC | 99 | 46.28 | 0.31 | 0.47 | 80.8 | 81.5 | 17.1 |
| Example 6-2 | LiFSI + $LiPF_6$ | EC | 69 | 34.28 | 0.42 | 0.5 | 81.3 | 82.0 | 16.9 |
| Example 6-3 | LiFSI + $LiPF_6$ | EC | 47 | 27.86 | 0.51 | 0.59 | 85.4 | 86.7 | 15.7 |
| Example 6-4 | LiFSI + $LiPF_6$ | EC | 32 | 23.14 | 0.62 | 0.72 | 84.1 | 85.2 | 16.5 |
| Example 6-5 | LiFSI + $LiPF_6$ | EC | 25 | 20.06 | 0.71 | 0.8 | 81.1 | 81.8 | 18.1 |

TABLE 7

Influence of other parameters in battery on battery performance

| Number | Lithium salt | Cyclicester | W2 (%) | H (g) | $\frac{W1}{W2}$ | $\frac{W2}{H}$ | 60° C. cycle capacity conservation rate (%) | 60° C. storage capacity conservation rate (%) | Initial DCR (mΩ) |
|---|---|---|---|---|---|---|---|---|---|
| | Related parameter of battery | | | | | | Battery performance | | |
| Example 7-1 | $LiPF_6$ | EC | 30.57 | 1.698 | 0.2 | 18.00 | 79.1 | 80.5 | 17.2 |
| Example 7-2 | $LiPF_6$ | EC | 17.47 | 0.873 | 0.5 | 20.00 | 81.5 | 81.3 | 16.9 |
| Example 7-3 | $LiPF_6$ | EC | 9.61 | 0.192 | 0.8 | 50.05 | 83.1 | 82.3 | 16.5 |
| Example 7-4 | $LiPF_6$ | EC | 12.67 | 0.158 | 0.9 | 80.19 | 84.1 | 84.2 | 16.2 |
| Example 7-5 | $LiPF_6$ | EC | 12.67 | 0.115 | 1.0 | 110.17 | 85.1 | 86.4 | 16 |
| Example 7-6 | $LiPF_6$ | EC | 12.67 | 0.09 | 1.0 | 140.78 | 83.2 | 85.1 | 16.4 |
| Example 7-7 | $LiPF_6$ | EC | 12.67 | 0.079 | 1.0 | 160.38 | 82.1 | 84.2 | 16.5 |
| Example 7-8 | $LiPF_6$ | EC | 9.61 | 0.058 | 0.95 | 165.69 | 81.1 | 81.3 | 16.5 |

Note
H: loading quantity of negative material on 1,540.25 $mm^2$ surface of current collector

TABLE 8

Influence of other parameters in battery on battery performance

| Number | Related parameter of battery: Lithium salt | Cyclicester | 100x | W2 (%) | $\frac{W1}{W2}$ | $\frac{W2}{100x}$ | Battery performance: 60° C. cycle capacity conservation rate (%) | 60° C. storage capacity conservation rate (%) | Initial DCR (mΩ) |
|---|---|---|---|---|---|---|---|---|---|
| Example 8-1 | $LiPF_6$ | EC | 50 | 16.0 | 0.9 | 0.32 | 85.4 | 86.7 | 15.7 |
| Example 8-2 | $LiPF_6$ | EC | 65 | 16.0 | 0.9 | 0.25 | 83.1 | 84.0 | 16.9 |
| Example 8-3 | $LiPF_6$ | EC | 85 | 16.0 | 0.9 | 0.19 | 80.2 | 80.4 | 18.1 |
| Example 8-4 | $LiPF_6$ | EC | 96 | 16.0 | 0.9 | 0.17 | 78.4 | 77.6 | 22.6 |

Note
W1: mass fraction of lithium salt in electrolyte solution;
W2: mass fraction of nickel atom content in cyclic ester in electrolyte solution;
x: material $LiNi_xCo_yMn_zO_2$ From Table 1, the corresponding lithium ion batteries of all the above examples have remarkably higher high-temperature cycle capacity conservation rates and high-temperature storage capacity conservation rates than Comparative Examples 1-2 and lower initial discharge DCR than Comparative Examples 1-2.

By comprehensively comparing Examples 1-1 to 1-6, when $$0.2 \leqslant \frac{W1}{W2} \leqslant 1.06,$$

the lithium ion batteries have high-temperature cycle capacity conservation rates higher than 75%, high-temperature storage capacity conservation rates higher than 80%, and initial discharge DCR within 20.5 mΩ. Further, the high-temperature cycle capacity conservation rate, the high-temperature storage capacity conservation rate and the initial discharge DCR of the lithium ion battery are further improved when $$0.8 \leqslant \frac{W1}{W2} \leqslant 1.0.$$

By comprehensively comparing Examples 2-1 to 2-8, when $$\frac{W1}{W2}$$

has a fixed value and B has a value of 5%-18%, the lithium ion batteries have high-temperature cycle capacity conservation rates higher than 75%, high-temperature storage capacity conservation rates higher than 80%, and initial discharge DCR not exceeding 17.2 mΩ. Further, the high-temperature cycle capacity conservation rate, the high-temperature storage capacity conservation rate and the initial discharge DCR of the lithium ion battery are further improved when B has a value of 13%-16%.

By comprehensively comparing Examples 3-1 to 3-8, when $$\frac{W1}{W2}$$

and a sum of C1 and C2 have fixed values and $$\frac{C1}{C2}$$

has a value of 0.05-5, the lithium ion batteries have high-temperature cycle capacity conservation rates higher than 78.5%, high-temperature storage capacity conservation rates higher than 81%, and initial discharge DCR not exceeding 17 mΩ. Further, the high-temperature cycle capacity conservation rate, the high-temperature storage capacity conservation rate and the initial discharge DCR of the lithium ion battery are further improved when $$\frac{C1}{C2}$$

has a value of 1-3.5.

By comprehensively comparing Examples 4-1 to 4-5, when $$\frac{W1}{W2}$$

and $$\frac{C1}{C2}$$

have fixed values and the sum of C1 and C2 has a value of 0.86M-1.4M, the lithium ion batteries have high-temperature cycle capacity conservation rates higher than 81.5%, high-temperature storage capacity conservation rates higher than 82.3%, and initial discharge DCR not exceeding 17 mΩ. Further, the high-temperature cycle capacity conservation rate, the high-temperature storage capacity conservation rate and the initial discharge DCR of the lithium ion battery are further improved when the sum of C1 and C2 has a value of 1-1.4.

By comprehensively comparing Examples 5-1 to 5-6, when $$\frac{W1}{W2}$$

has a fixed value and $$\left[\frac{W2}{5}+2*A\right]$$

has a value of 10-16, the lithium ion batteries have high-temperature cycle capacity conservation rates higher than 83%, high-temperature storage capacity conservation rates higher than 84%, and initial discharge DCR not exceeding 16.5 mΩ. Further, the high-temperature cycle capacity conservation rate, the high-temperature storage capacity conservation rate and the initial discharge DCR of the lithium ion battery are further improved when $$\left[\frac{W2}{5}+2*A\right]$$

has a value of 11.9-13.5.

By comprehensively comparing Examples 6-1 to 6-5, when $$\frac{W2}{100x}$$

has a value of 0.5-0.72, the lithium ion batteries have high-temperature cycle capacity conservation rates higher than 81.3%, high-temperature storage capacity conservation rates higher than 82%, and initial discharge DCR not exceeding 17 mΩ.

By comprehensively comparing Examples 7-1 to 7-8, when $$\frac{W1}{W2}$$

has a fixed value and $$\frac{W2}{H}$$

has a value of 20-166, the lithium ion batteries have high-temperature cycle capacity conservation rates higher than 81.5%, high-temperature storage capacity conservation rates not lower than 81.3%, and initial discharge DCR not exceeding 16.9 mΩ. Further, the high-temperature cycle capacity conservation rate, the high-temperature storage capacity conservation rate and the initial discharge DCR of the lithium ion battery are further improved when $$\frac{W2}{H}$$

has a value of 50-141.

Examples 8-1 to 8-4 illustrate that, for several types of current common ternary positive active materials $LiNi_xCo_yMn_zO_2$, i.e., ternary positive active materials with nickel atom contents of 0.5, 0.65, 0.85 and 0.96, correspondingly fabricated lithium ion batteries have good high-temperature cycle capacity conservation rates, high-temperature storage capacity conservation rates, and initial discharge DCR.

It should be noted that the present disclosure is not limited to the above embodiments. The above-mentioned embodiments are merely examples, and embodiments having substantially the same configuration as the technical idea and exerting the same effects within the scope of the technical solution of the present disclosure are all included in the technical scope of the present disclosure. Furthermore, other embodiments configured by applying various modifications that can be conceived by those skilled in the art to the embodiments and combining some constituent elements in the embodiments are also included in the scope of the present disclosure without departing from the scope of the gist of the present disclosure.

What is claimed is:

1. A lithium ion battery, comprising:

a positive plate, a negative plate, and an electrolyte solution, wherein the electrolyte solution comprises an electrolyte salt, a film formation additive, and an organic solvent, the electrolyte salt comprises lithium salt, the organic solvent comprises cyclic ester, a mass fraction W1 of the lithium salt in the electrolytic solution and a mass fraction W2 of the cyclic ester in the electrolytic solution satisfy $$0.2 \le \frac{W1}{W2} \le 1.06,$$

W1 is from 6.4% to 12.65%, W2 is from 0.86% to 32.69%, the lithium salt comprises lithium bis(fluorosulfonyl)imide and lithium hexafluorophosphate, the cyclic ester comprises ethylene carbonate.

2. The lithium ion battery according to claim 1, wherein the positive plate comprises a positive active material $LiNi_xCo_yMn_zO_2$, where $0<x<1$, $0\le y\le 1$, $0\le z<1$, $x+y+z=1$, $x+y+z=1$, and the mass fraction W2 of the cyclic ester in the electrolyte solution and a nickel atom content x satisfy a relation:

$$0.5 \le \frac{W2}{100x} \le 0.72.$$

3. The lithium ion battery according to claim 2, wherein $0.5<x<1$.

4. The lithium ion battery according to claim 1, wherein a loading quantity H of a negative material on a 1,540.25 $mm^2$ surface of a current collector and the mass fraction W2 of the cyclic ester in the electrolyte solution satisfy a relation:

$$20 \le \frac{W2}{H} \le 166.$$

5. The lithium ion battery according to claim 1, wherein $$\frac{W1}{W2}$$

ranges from 0.5 to 1.06.

6. The lithium ion battery according to claim 1, wherein a mass fraction B of the cyclic ester with respect to the organic solvent is 5%-18%.

7. The lithium ion battery according to claim 1, wherein a molar concentration C1 of the lithium bis(fluorosulfonyl)imide and a molar concentration C2 of the lithium hexafluorophosphate have a ratio $$\frac{C1}{C2}$$

of 0.05-5.

8. The lithium ion battery according to claim 1, wherein, the film formation additive comprises at least one of fluoroethylene carbonate (FEC), vinylene carbonate (VC), ethylene sulfate (DTD) and 1,3-propane sultone (PS), a mass fraction A of the film formation additive in the electrolyte solution and the mass fraction W2 of the cyclic ester in the electrolyte solution satisfy:

$$10 \le \frac{W2}{5} + 2 * A \le 16.$$

9. The lithium ion battery according to claim 8, wherein, the film formation additive comprises at least one selected from fluoroethylene carbonate (FEC), ethylene sulfate (DTD), and 1,3-propane sultone (PS).

10. An electric device, comprising:

a lithium ion battery, wherein the lithium ion battery comprises a positive plate, a negative plate, and an electrolyte solution, the electrolyte solution comprises an electrolyte salt, a film formation additive, and an organic solvent, the electrolyte salt comprises lithium salt, the organic solvent comprises cyclic ester, a mass fraction W1 of the lithium salt in the electrolytic solution and a mass fraction W2 of the cyclic ester in the electrolytic solution satisfy $$0.2 \le \frac{W1}{W2} \le 1.06,$$

W1 is from 6.4% to 12.65%, W2 is from 0.86% to 32.69%, the lithium salt comprises lithium bis(fluorosulfonyl)imide and lithium hexafluorophosphate, the cyclic ester comprises ethylene carbonate.

11. The electric device according to claim 10, wherein the positive plate comprises a positive active material $LiNi_xCo_yMn_zO_2$, where $0<x<1$, $0\le y<1$, $0\le z<1$, $x+y+z=1$, and the mass fraction W2 of the cyclic ester in the electrolyte solution and a nickel atom content x satisfy a relation:

$$0.5 \le \frac{W2}{100x} \le 0.72.$$

12. The electric device according to claim 11, wherein $0.5<x<1$.

13. The electric device according to claim 10, wherein a loading quantity H of a negative material on a 1,540.25 $mm^2$ surface of a current collector and the mass fraction W2 of the cyclic ester in the electrolyte solution satisfy a relation:

$$20 \le \frac{W2}{H} \le 166.$$

14. The electric device according to claim 10, wherein, the film formation additive comprises at least one selected from fluoroethylene carbonate (FEC), vinylene carbonate (VC), ethylene sulfate (DTD), and 1,3-propane sultone (PS), a mass fraction A of the film formation additive in the electrolyte solution and the mass fraction W2 of the cyclic ester in the electrolyte solution satisfy:

$$10 \le \frac{W2}{5} + 2 * A \le 16.$$

15. The electric device according to claim 14, wherein, the film formation additive comprises at least one selected from fluoroethylene carbonate (FEC), ethylene sulfate (DTD), and 1,3-propane sultone (PS).

* * * * *